(12) United States Patent
Todd et al.

(10) Patent No.: US 11,725,830 B2
(45) Date of Patent: Aug. 15, 2023

(54) OVEN APPLIANCE SPILL PLUG INSERT

(71) Applicant: Haier US Appliance Solutions, Inc., Wilmington, DE (US)

(72) Inventors: Justin Patrick Todd, Louisville, KY (US); Cassandra Brady, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 323 days.

(21) Appl. No.: 17/117,541

(22) Filed: Dec. 10, 2020

(65) Prior Publication Data
US 2022/0186941 A1  Jun. 16, 2022

(51) Int. Cl.
| | |
|---|---|
| F24C 15/14 | (2006.01) |
| F24C 15/08 | (2006.01) |
| F24C 3/08 | (2006.01) |
| A21B 1/00 | (2006.01) |
| A47J 37/01 | (2006.01) |
| F24C 5/00 | (2006.01) |
| F24C 1/00 | (2006.01) |

(52) U.S. Cl.
CPC ............... *F24C 15/14* (2013.01); *A21B 1/00* (2013.01); *F24C 3/08* (2013.01); *F24C 15/086* (2013.01); *A47J 37/01* (2013.01); *F24C 1/00* (2013.01); *F24C 5/00* (2013.01)

(58) Field of Classification Search
CPC .......... F24C 15/14; F24C 15/08; F24C 3/008; F24C 3/002; F24C 1/00; F24C 5/00; A21B 1/00; A47J 37/01
USPC ........................................................ 126/277

IPC ....... F24C 15/14,15/08, 3/00, 1/00, 5/00; A21B 1/00; A47J 37/01

See application file for complete search history.

(56) References Cited

U.S. PATENT DOCUMENTS

| | | | | |
|---|---|---|---|---|
| 86,147 | A * | 1/1869 | Gibson, Jr. ........... | F24C 15/086 126/304 A |
| 190,716 | A * | 5/1877 | Hauersperger ........ | F24C 15/086 5/311 |
| 1,036,726 | A * | 8/1912 | Salisbury ............... | F24C 15/086 16/33 |
| 1,851,183 | A * | 3/1932 | Hill .......................... | A21B 1/50 312/410 |
| 4,490,596 | A | 12/1984 | Hirai et al. | |
| 8,757,565 | B2 * | 6/2014 | Adams .................. | F24C 15/086 248/188.4 |
| 10,443,858 | B2 | 10/2019 | Stokes et al. | |
| 10,495,320 | B2 | 12/2019 | Torrentes et al. | |

(Continued)

FOREIGN PATENT DOCUMENTS

DE    10156397 A1 *  5/2003  ............. A47B 81/02

*Primary Examiner* — Steven B McAllister
*Assistant Examiner* — Daniel E. Namay
(74) *Attorney, Agent, or Firm* — Dority & Manning, P.A.

(57) ABSTRACT

An oven appliance includes a cabinet having a front portion spaced apart from a back portion and a left side spaced apart from a right side. The oven appliance also includes a cooktop defined on a top panel of the cabinet. A levelling leg extends through the cabinet from a levelling foot below the cabinet to an adjustment screw below the top panel. The oven appliance further includes a trough positioned below the top panel of the cabinet and above the adjustment screw. The trough includes an aperture located directly above the adjustment screw. The oven appliance further includes a resilient plug configured to be received in the aperture such that the resilient plug sealingly engages the aperture.

20 Claims, 10 Drawing Sheets

(56) References Cited

U.S. PATENT DOCUMENTS

| | | | |
|---|---|---|---|
| 2005/0098693 A1* | 5/2005 | Holt | F16M 7/00 248/188.4 |
| 2013/0313386 A1* | 11/2013 | Adams | F24C 15/086 248/188.4 |
| 2018/0347822 A1* | 12/2018 | Jang | F24C 15/083 |
| 2019/0212014 A1 | 7/2019 | Chadwick et al. | |
| 2022/0186940 A1* | 6/2022 | Todd | F24C 15/14 |

* cited by examiner

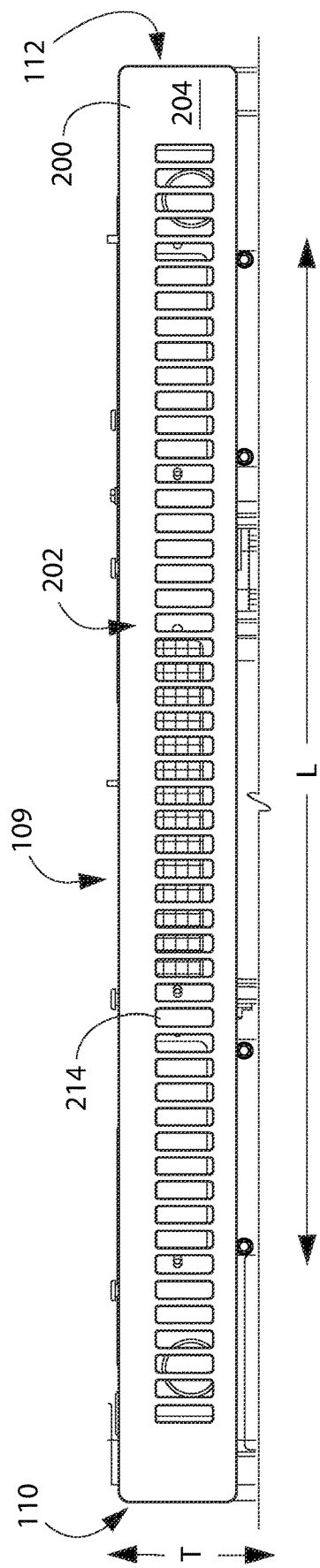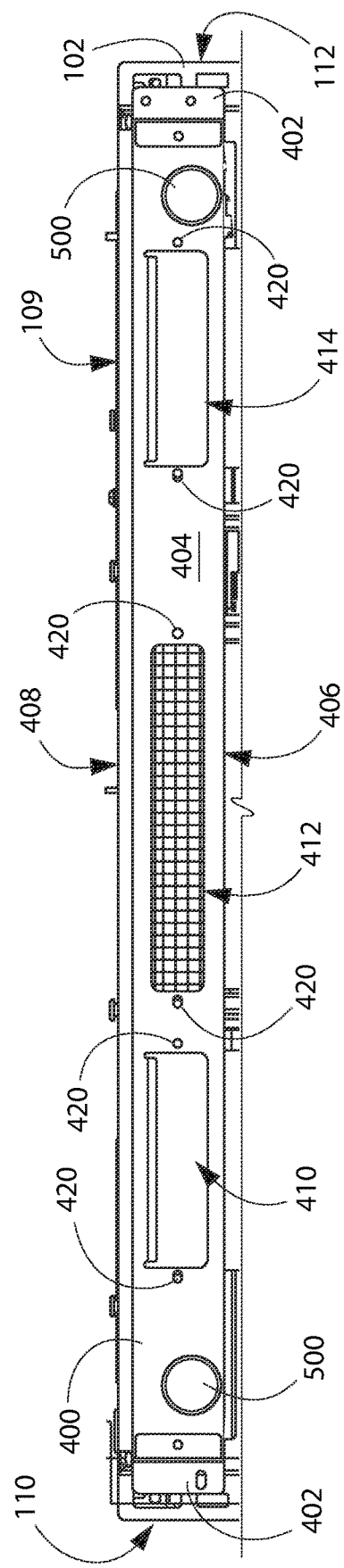
FIG. 3
FIG. 4

OVEN APPLIANCE SPILL PLUG INSERT

FIELD OF THE INVENTION

The present subject matter relates generally to oven appliances, and more particularly to oven appliances including a spill management system with features for selectively accessing adjacent components.

BACKGROUND OF THE INVENTION

Oven appliances generally include a cabinet that defines a cooking chamber for cooking food items therein, such as by baking or broiling the food items. A cooktop may be provided on a top panel of the cabinet. The cooktop typically includes multiple heating elements for receipt of cooking utensils thereon. During a cooking operation, food items may be added to, removed from, or transferred between such cooking utensils. Also, cooking operations frequently involve stirring or mixing food items within the cooking utensils on the cooktop. In some instances, food items may boil over and spill out of the cooking utensils. In addition to the foregoing examples, there are numerous circumstances which can lead to spills on or around the cooktop. In some instances, spilled food items, or other items, in particular liquids, that are spilled on or around the cooktop may leak into the cabinet and may interfere with intended operations of internal components of the oven appliance.

However, structures which inhibit spills from reaching sensitive internal components of the appliance may also undesirably limit access to adjacent internal components, such as components which may need to be accessed for manual adjustment or customization.

Accordingly, oven appliances which provide features for managing spills, and in particular for protecting sensitive internal components of the oven appliance from spills while also permitting access to adjacent components, are desired.

BRIEF DESCRIPTION OF THE INVENTION

Aspects and advantages of the invention will be set forth in part in the following description, or may be apparent from the description, or may be learned through practice of the invention.

In one exemplary embodiment, an oven appliance is provided. The oven appliance includes a cabinet. The cabinet defines a vertical direction, a lateral direction, and a transverse direction. The vertical, lateral, and transverse directions are mutually perpendicular. The cabinet includes a front portion spaced apart from a back portion along the transverse direction and a left side spaced apart from a right side along the lateral direction. The oven appliance also includes a cooktop defined on a top panel of the cabinet. A levelling leg extends through the cabinet along the vertical direction from a levelling foot below the cabinet to an adjustment screw below the top panel. The oven appliance further includes a trough positioned below the top panel of the cabinet and above the adjustment screw. The trough includes an aperture located directly above the adjustment screw. The oven appliance further includes a resilient plug configured to be received in the aperture such that the resilient plug sealingly engages the aperture.

In another exemplary embodiment, an oven appliance is provided. The oven appliance includes a cabinet having a front portion spaced apart from a back portion and a left side spaced apart from a right side. The oven appliance also includes a cooktop defined on a top panel of the cabinet. A levelling leg extends through the cabinet from a levelling foot below the cabinet to an adjustment screw below the top panel. The oven appliance further includes a trough positioned below the top panel of the cabinet and above the adjustment screw. The trough includes an aperture located directly above the adjustment screw. The oven appliance further includes a resilient plug configured to be received in the aperture such that the resilient plug sealingly engages the aperture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 3 provides an overhead view of a portion of the oven appliance of FIG. 1.

FIG. 4 provides an overhead view of a portion of the oven appliance of FIG. 1 with a vent trim piece removed.

Figure 1:
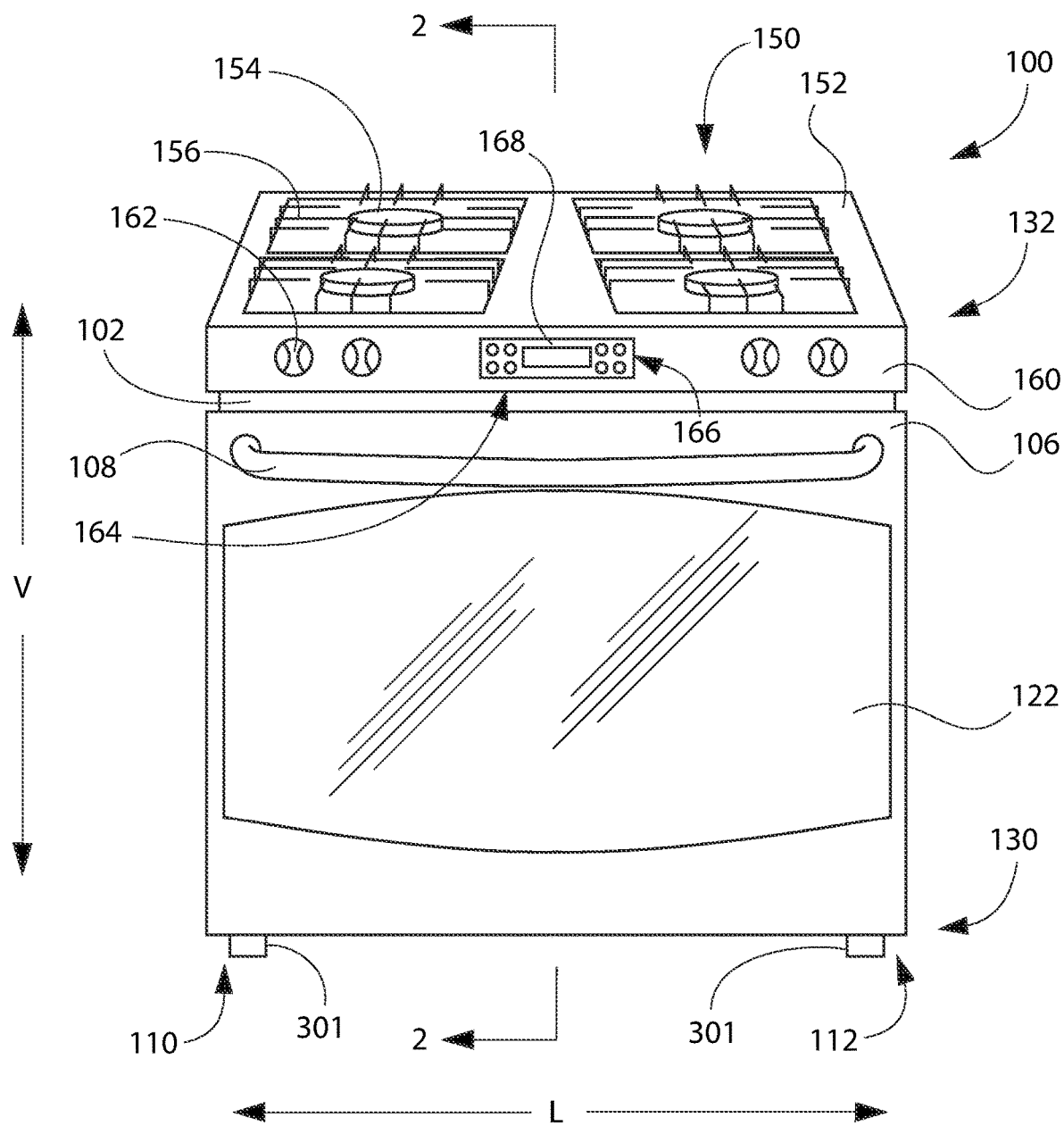
FIG. 1 provides a perspective view of an oven appliance according to one or more exemplary embodiments of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. The detailed description uses numerical and letter designations to refer to features in the drawings. Like or similar designations in the drawings and description have been used to refer to like or similar parts of the disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
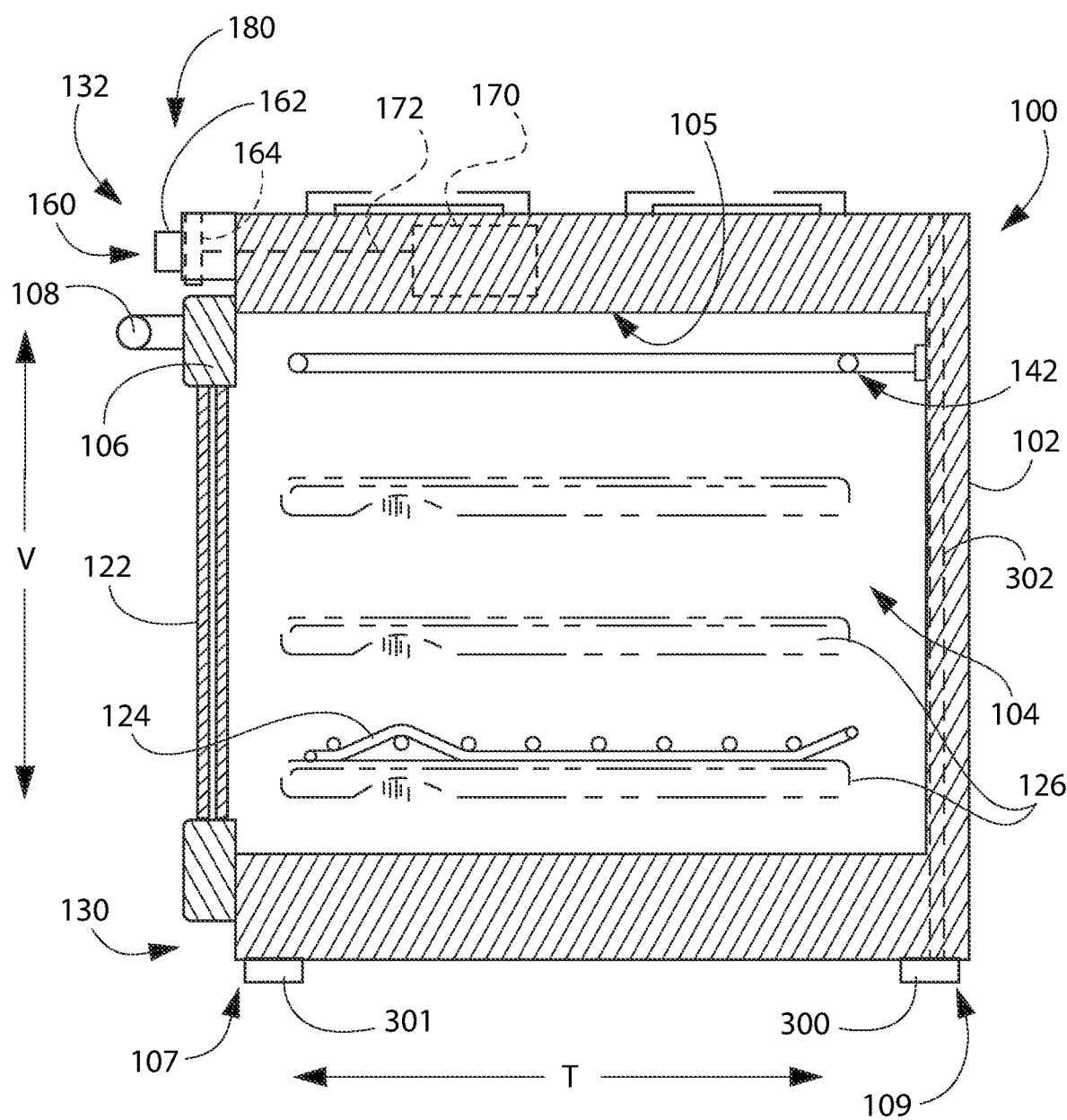
FIG. 2 provides a section view of the oven appliance of FIG. 1 taken along line 2-2 of FIG. 1.

FIG. 1 provides a front perspective view of an oven appliance 100 according to exemplary embodiments of the present subject matter. FIG. 2 provides a section view of exemplary oven appliance 100 taken along line 2-2 of FIG. 1. Oven appliance 100 is shown in FIGS. 1 and 2 as a free-standing range oven appliance, but it will be appreciated that oven appliance 100 is provided by way of example only and is not intended to limit the present subject matter in any aspect. Thus, the present subject matter may be used with other oven appliance configurations, e.g., a cooktop appliance and/or oven appliances that define one or more interior cavities for the receipt of food items and/or having different pan or rack arrangements than what is shown in FIG. 2, among numerous other possible variations within the scope of the present disclosure.

Oven appliance 100 includes an insulated cabinet 102 with an interior cooking chamber 104 defined by an interior surface 105 of cabinet 102. Cooking chamber 104 is configured for receipt of one or more food items to be cooked. Cabinet 102 extends between a bottom portion 130 and a top portion 132 along a vertical direction V. Cabinet 102 also extends between a front portion 107 and a back portion 109 along a transverse direction T and between a first side 110 and a second side 112 along a lateral direction L. The first side 110 may be a left side and the second side 112 may be a right side, e.g., from the perspective of a user standing in front of the oven appliance 100, such as to access the user inputs 166 and/or door 106. The vertical direction V, the lateral direction L, and the transverse direction T are mutually perpendicular and form an orthogonal direction system.

Oven appliance 100 includes a door 106 rotatably mounted to cabinet 102, e.g., with a hinge (not shown). A handle 108 is mounted to door 106 and assists a user with opening and closing door 106. For example, a user can pull or push handle 108 to open or close door 106 to access cooking chamber 104. Oven appliance 100 includes a seal (not shown) between door 106 and cabinet 102 that maintains heat and cooking fumes within cooking chamber 104 when door 106 is closed as shown in FIGS. 1 and 2. Multiple parallel glass panes 122 provide for viewing the contents of cooking chamber 104 when door 106 is closed and provide insulation for cooking chamber 104. A baking rack 124 is positioned in cooking chamber 104 for receipt of food items or utensils containing food items. Baking rack 124 is slidably received onto embossed ribs or sliding rails 126 such that rack 124 may be conveniently moved into and out of cooking chamber 104 when door 106 is open.

A top heating element or broil element 142 is positioned in cooking chamber 104 of cabinet 102 proximate top portion 132 of cabinet 102. Top heating element 142 is used to heat cooking chamber 104 for both cooking/broiling and cleaning of oven appliance 100. The size and heat output of top heating element 142 can be selected based on, e.g., the size of oven appliance 100. In the exemplary embodiment shown in FIG. 2, top heating element 142 is shown as an electric resistance heating element.

As shown in FIG. 1, oven appliance 100 includes a cooktop 150. Cooktop 150 is disposed on and is attached to or integral with cabinet 102. Cooktop 150 includes a top panel 152, which by way of example may be constructed of glass, ceramics, enameled steel, or combinations thereof. One or more burners 154 extend through top panel 152. A utensil (e.g., pots, pans, etc.) holding food and/or cooking liquids (e.g., oil, water, etc.) may be placed onto grates 156 disposed adjacent burners 154. Burners 154 provide thermal energy to cooking utensils placed on grates 156. Burners 154 can be any suitable type of burners, including e.g., gas, electric, electromagnetic, a combination of the foregoing, etc. It will be appreciated that the configuration of cooktop 150 is provided by way of example only and that other suitable configurations are contemplated.

Oven appliance 100 includes a user interface panel 160. For this exemplary embodiment, user interface panel 160 includes a number of knobs 162 that each correspond to one of the burners 154. Knobs 162 allow users to activate each burner 154 and to determine the amount of heat input provided by each burner 154 to a cooking utensil located thereon.

User interface panel 160 also includes a control panel 164 that provides visual information to a user and allows the user to select various operational features for the operation of oven appliance 100 via one or more user inputs 166. One or more of a variety of electrical, mechanical or electromechanical input devices including rotary dials, push buttons, toggle/rocker switches, and/or touch pads can also be used singularly or in combination as user inputs 166.

A display 168 of control panel 164 may present certain information to users, such as, e.g., whether a particular burner 154 is activated and/or the level at which the burner 154 is set. Display 168 can be a touch sensitive component (e.g., a touch-sensitive display screen or a touch pad) that is sensitive to the touch of a user input object (e.g., a finger or a stylus). Display 168 may include one or more graphical user interfaces that allow for a user to select or manipulate various operational features of oven appliance 100 or its cooktop 150.

Referring now specifically to FIG. 2, the operation of oven appliance 100 is controlled by a processing device or controller 170. As shown, controller 170 is communicatively coupled with control panel 164 and its user inputs 166. Controller 170 may also be communicatively coupled with various operational components of oven appliance 100 as well, e.g., heating element 142, knobs 162, temperature sensors, cameras, speakers, and microphones, etc. Input/output ("I/O") signals may be routed between controller 170 and the various operational components of oven appliance 100. Thus, controller 170 can selectively activate and operate these various components. Various components of oven appliance 100 are communicatively coupled with controller 170 via one or more communication lines 172, such as, e.g., signal lines, shared communication busses, or wirelessly.

Controller 170 includes one or more memory devices and one or more processors (not labeled). The processors can be any combination of general or special purpose processors, CPUs, or the like that can execute programming instructions or control code associated with operation of oven appliance 100. The memory devices may represent random access memory such as DRAM or read only memory such as ROM or FLASH. In one embodiment, the processor executes programming instructions stored in memory. The memory may be a separate component from the processor or may be included onboard within the processor. Alternatively, controller 170 may be constructed without using a processor, e.g., using a combination of discrete analog and/or digital logic circuitry (such as switches, amplifiers, integrators, comparators, flip-flops, AND gates, and the like) to perform control functionality instead of relying upon software. Controller 170 may include a network interface such that controller 170 can connect to and communicate over one or more networks with one or more network nodes. Controller 170 can also include one or more transmitting, receiving, and/or transceiving components for transmitting/receiving communications with other devices communicatively coupled with oven appliance 100. Additionally or alternatively, one or more transmitting, receiving, and/or transceiving components can be located off board controller 170. Controller 170 can be positioned in a variety of locations throughout oven appliance 100. For this embodiment, controller 170 is located proximate user interface panel 160 toward top portion 132 of oven appliance 100.

Control panel 164, including user inputs 166 and display 168, and knobs 162 collectively make up a user interface 180 of oven appliance 100. User interface 180 provides a means for users to communicate with and operate oven appliance 100. It will be appreciated that other components or devices that provide for communication with oven appliance 100 for operating oven appliance 100 may also be included in user interface. For example, although not shown, user interface 180 may include a speaker, a microphone, a camera or motion detection camera for detecting a user's proximity to oven appliance 100 or for picking up certain motions, and/or other user interface elements in various combinations.

As may be seen in FIGS. 1 and 2, the oven appliance 100 may include a plurality of levelling feet, e.g., four levelling feet with one levelling foot at or proximate to each bottom corner of the cabinet 102, which extend downward along the vertical direction V from the cabinet 102 to support the cabinet 102 and the remainder of the oven appliance 100 on a surface such as a floor. As is generally understood in the art, the levelling legs may be adjustable, e.g., may have a variable height relative to the cabinet 102 in order to level the cabinet 102, such as by threading the levelling feet to the cabinet 102. In particular, the plurality of levelling feet may include two front feet 301 positioned along the front portion 107 and two back feet 300 positioned along the back portion 109. The front feet 301 are directly adjustable, e.g., the front feet 301 may be adjusted by directly accessing the front feet 301 from in front of the oven appliance 100 when the oven appliance 100 is in an installed position, such as surrounded by cabinetry and/or a countertop, etc. However, the back feet 300 may not be as easily accessed as the front feet 301 when the oven appliance 100 is in the installed position, e.g., the back feet 300 may be obstructed by surrounding cabinetry, etc. Thus, a levelling leg 302 may be provided which extends through the cabinet 102 along the vertical direction V from one of the back levelling feet 300 below the cabinet 102 to an adjustment screw 304 (see, e.g., FIGS. 7 and 8).

The levelling screw 304 and levelling leg 302 may be connected to the levelling foot 300 for adjustment of the levelling foot 300 relative to the cabinet 102. For example, the levelling foot 300 may be threadedly engaged with the cabinet 102 and the levelling screw 304 and levelling leg 302 may be connected to the levelling foot 300 such that rotation of the levelling screw 304 is transferred to the levelling leg 302 which, in turn, transfers the rotation to the levelling foot 300, thereby screwing the levelling leg 300 into the cabinet 102 and/or unscrewing the levelling leg 300 from the cabinet 102. As another example, the levelling screw 302 may be threadedly engaged with the cabinet 102 such that rotation of the levelling screw 302 adjusts the threaded connection between the levelling screw 302 and the cabinet 102 to change the effective length of the levelling leg 302 and the vertical position of the levelling foot 300 relative to the cabinet 102.

FIG. 3 illustrates a top-down, overhead view of a portion of the oven appliance 100, in particular, the back portion 109 of the cabinet 102 and a neighboring area of the oven appliance 100. FIG. 4 also illustrates the same portion of the oven appliance 100, with a vent trim piece 200 (FIG. 3) removed in order to more clearly illustrate certain internal components of the oven appliance 100. As may be seen in FIG. 3, the vent trim piece 200 may include an air grille 202 defined therein, such as in a top wall 204 of the vent trim piece 200 as in the illustrated embodiment. The air grille 202 may include a plurality of apertures 214 through the top wall 204 of the vent trim piece 200. In some embodiments, the vent trim piece 200 may extend fully across the cabinet 102, e.g., along the lateral direction L from the left side 110 to the right side 112.

As may be seen in FIG. 4, in some embodiments, the oven appliance 100 may include a trough 400 positioned below the air grille 202, e.g., below the air grille 202 along the vertical direction V and generally aligned with the air grille along the lateral direction L and the transverse direction T. As noted above, terms such as "generally" include a ten percent margin of error. Thus, "generally aligned" is to be understood as including an offset in any direction of up to ten percent of the dimension of the air grille 200 along that direction. For example, if the air grille 200 defines a width along the lateral direction L, the air grille 200 and the trough 400 may be offset along the lateral direction L by up to ten percent of the width, such as the lateral center points (or center lines) of the air grille 200 and the trough 400 may be laterally spaced apart by up to ten percent of the width, while the air grille 200 and the trough 400 may still be considered generally aligned.

Figure 5:
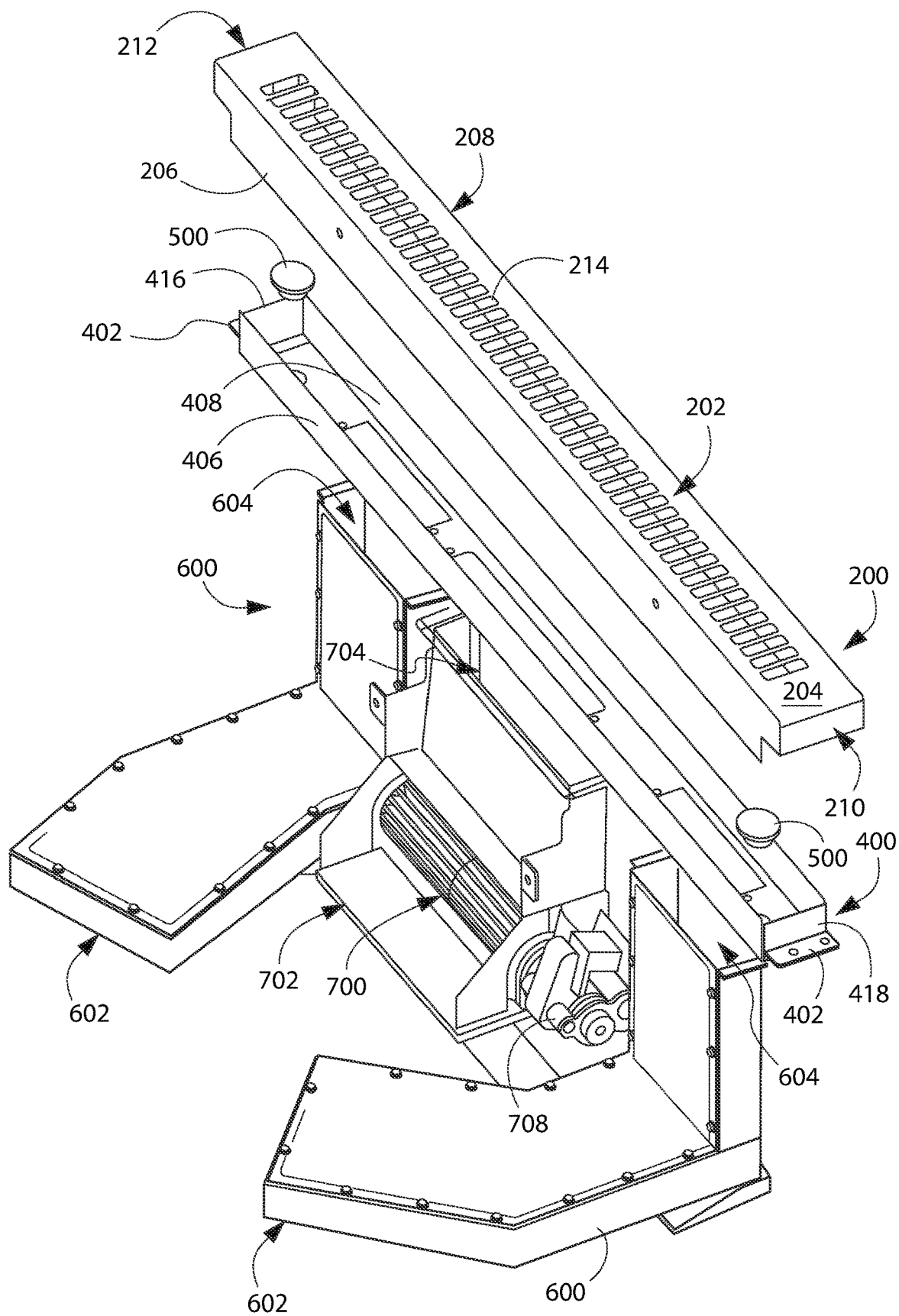
FIG. 5 provides an exploded view of certain components of the oven appliance of FIG. 1.

Referring now to FIGS. 4 and 5, the trough 400 may include a plurality of sidewalls which are oriented along the vertical direction V and a bottom wall 404. The plurality of sidewalls may be oriented along the vertical direction V in that each sidewall of the plurality of sidewalls extends upwards along the vertical direction V from the bottom wall 404. In particular embodiments, the plurality of sidewalls may include a front wall 406, a rear wall 408, a left wall 416 and a right wall 418. The trough 400 may, in some embodiments, also include one or more flanges 402. As illustrated in FIG. 4, in such embodiments, the trough 400 may be fastened to the cabinet 102 by mechanical fasteners through the flange or flanges 402. As may be seen in FIGS. 3 and 5, the vent trim piece 200 may include a plurality of sidewalls which are oriented along the vertical direction V in that each sidewall of the plurality of sidewalls extends downward along the vertical direction from the top wall 204 of the vent trim piece 200. In particular embodiments, the plurality of sidewalls of the vent trim piece 200 may include a front wall 206, a rear wall 208, a left wall 212 and a right wall 210.

In some embodiments, e.g., as illustrated in the accompanying FIGS., the bottom wall 404 of the trough 400 may be flat. For example, the bottom wall 404 of the trough 400 may be positioned and oriented perpendicular or generally perpendicular to the vertical direction V. As a further example, the bottom wall 404 may be flat in that the bottom wall 404 is generally linear, e.g., straight without curve, and maintains a generally constant angle with respect to each of the lateral direction L, the transverse direction T, and the vertical direction V, where, e.g., generally constant includes variations of up to ten degrees in any direction, as described above. In such embodiments, the flat bottom wall 404 of the trough 400 may advantageously reduce the space taken up by the trough 400 and promote ease of assembly of the trough 400 in the oven appliance 100.

As best seen in FIG. 4, the trough 400 may include one or more ports, e.g., three ports 410, 412, and 414, defined through the bottom wall 404. In some embodiments, e.g., as illustrated in FIG. 5, the oven appliance 100 may include one or more air ducts which are aligned with and coupled to the one or more ports. For example, in the embodiment illustrated in FIG. 5, the one or more air ducts include two vent ducts 600 and a cooling duct 700. Each vent duct 600 extends from an inlet 602 to an outlet 604. Each inlet 602 may be positioned in or adjacent to the cooking chamber 104 whereby each vent duct 600 is in fluid communication with the cooking chamber via the respective inlet 602 thereof. For example, each vent duct 600 may be in direct fluid communication with the chamber 104 such that various fluids, e.g., air, cooking byproducts, etc., including particles entrained therein, flow directly from the chamber 104 into the inlet 602 of each vent duct 600. The cooling duct 700 includes an intake 702 and a cooling fan 708 positioned within the cooling duct 700. The cooling duct 700 extends from the cooling fan 708 to an outlet 704. In some embodiments, the outlet 604 of one of the vent ducts 600 may be coupled to a first port 410 in the trough 400, the outlet 704 of the cooling duct 700 may be coupled to a second port 412 in the trough 400, and the outlet 604 of the other vent duct 600 may be coupled to a third port 414 of the trough 400. The outlets may be coupled to the respective ports, e.g., with mechanical fasteners, such as the fasteners 420 illustrated in FIG. 4, which may be bolts, rivets, or other suitable fasteners. With the outlets 604 and 704 aligned with and/or coupled to the respective ports 410, 412, and 414, the trough 400 thereby permits fluid communication between the vent outlet 704 and the air grille 202 and between the cooling outlet(s) 604 and the air grille 202. At the same time, the trough 400 obstructs fluid communication between the air grille 200 and an interior of the cabinet 102. For example, the interior of the cabinet 102 which the trough 400 obstructs may be a plenum space within the cabinet 102, which may also be considered or referred to as a free volume or open space within the cabinet 102, e.g., a space or volume which is inside of the cabinet 102 but otherwise not contained within or included inside any other components of the oven appliance, in particular, a space or volume which is inside of the cabinet 102 but outside of the ducts 600 and 700. Thus, the trough 400 may collect any spills from the cooktop 150 and channel or direct such spilled matter, e.g., liquids, to one of the ducts 600 and 700, whereby the spill is contained and is prevented from reaching the open spaces inside of the cabinet 102. In some embodiments, e.g., as illustrated in FIG. 4, the vent outlet 604 and the cooling outlet 704 may be aligned along the transverse direction T and spaced apart along the lateral direction L. In such embodiments, the interior of the cabinet 102 which the trough 400 obstructs may include an interstitial area between the vent outlet 604 and the cooling outlet 704 along the lateral direction L, such as an area between the outlets 604 and 704 and portions of the free volume within the cabinet 102 downstream of that area.

Figure 6:
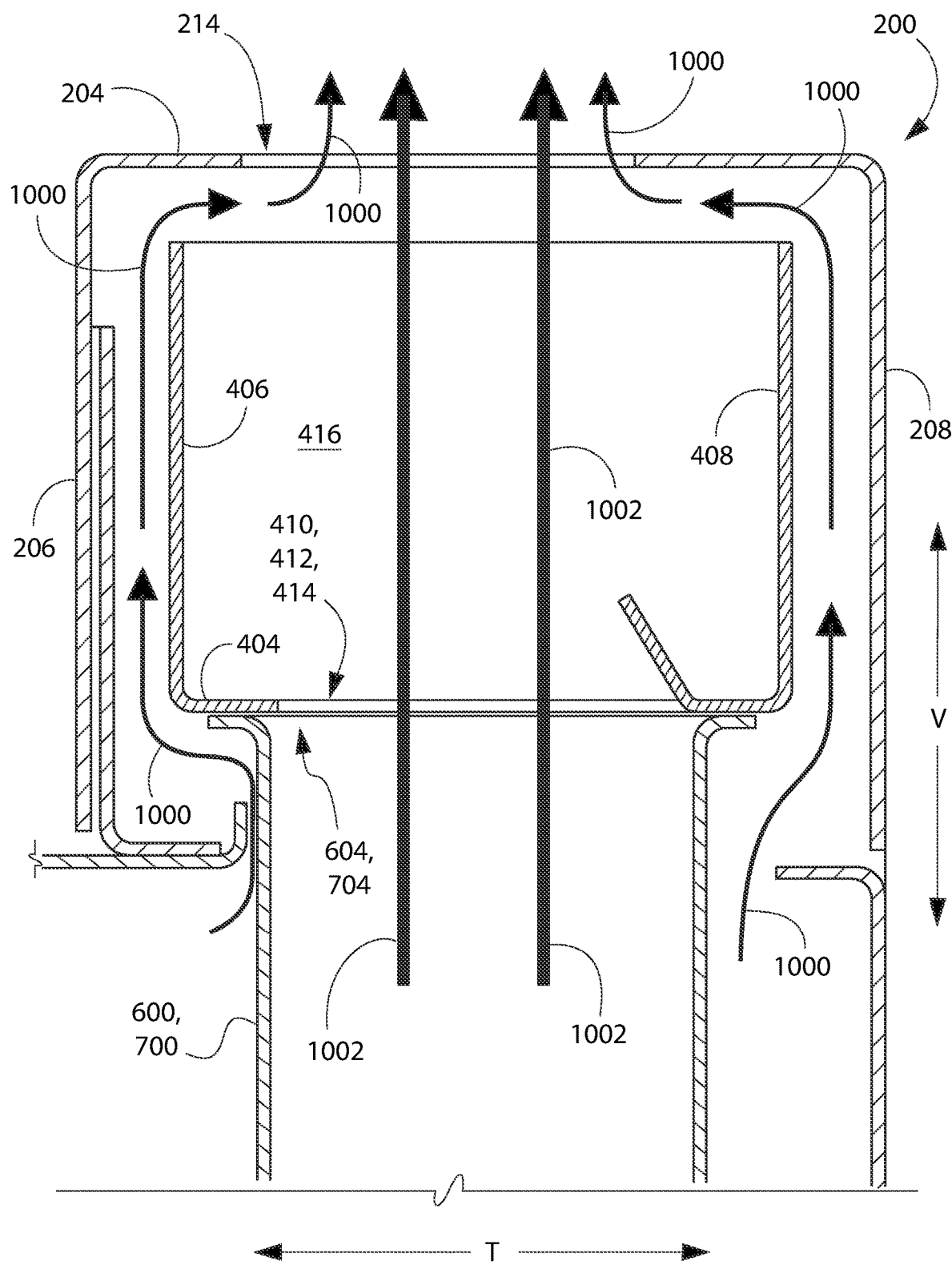
FIG. 6 provides a section view of a portion of the oven appliance of FIG. 1.

In some embodiments, e.g., as illustrated in FIG. 6, the trough 400 may be positioned within the vent trim piece 200. For example, as may be seen in FIG. 6, in such embodiments, the trough 400 may be enclosed by the vent trim piece 200 on five sides. FIG. 6 illustrates a cross-section through the trough 400 and the vent trim piece 200 at one of the air ducts, e.g., one of the vent ducts 600 or the cooling duct 700, where the outlet 604 or 704 is coupled to a corresponding one of the ports 410, 412, or 414 of the trough 400. As can be seen in FIG. 6, the front wall 406 of the trough 400 may face the front wall 206 of the vent trim piece 200 and the front walls 406, 206, may be generally parallel. Similarly, the back wall 408 of the trough 400 may face the back wall 208 of the vent trim piece 200 and the back walls 408, 208, may be generally parallel. Each pair of facing walls may be spaced apart, e.g., the front wall 406 of the trough 400 may be spaced apart from the front wall 206 of the vent trim piece 200 along the transverse direction T and the rear wall 408 of the trough 400 may be spaced apart from the rear wall 208 of the vent trim piece 200 along the transverse direction T. Such spacing of the respective walls of the trough 400 and the vent trim piece 200 may provide a clearance space between the trough 400 and the vent trim piece 200 at the front and back sides, whereby natural convection airflow, represented by arrows 1000 in FIG. 6, may be permitted to reach the air grille 202. At the same time, air flow 1002 from the air duct, e.g., oven venting from one of the vent ducts 600 or cooling fan exhaust from the cooling duct 700, is also able to reach the air grille 202, including the apertures 214 thereof.

Figure 7:
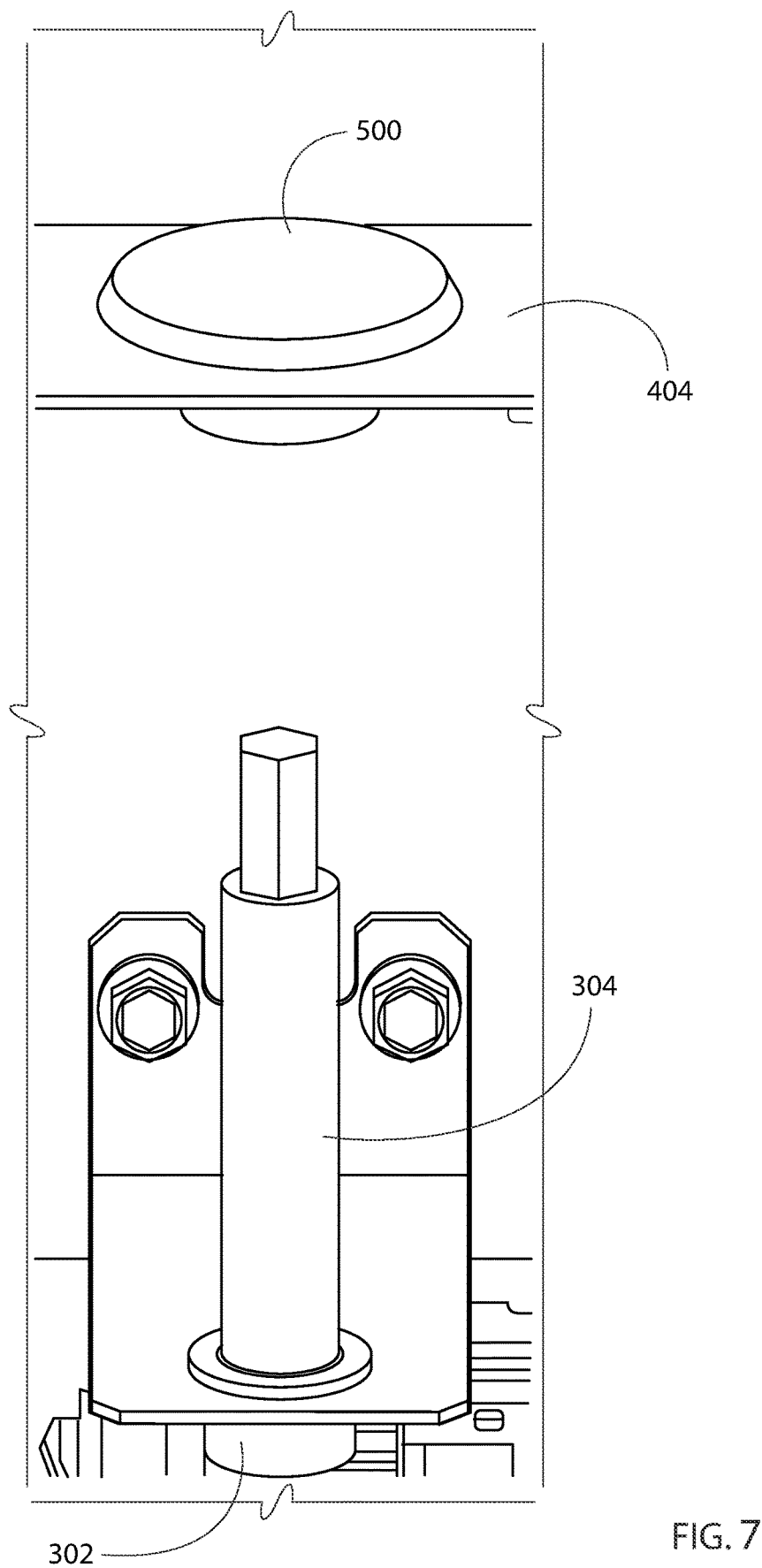
FIG. 7 provides an enlarged view of a trough and a resilient plug of the oven appliance of FIG. 1 with the resilient plug in an installed position.

As mentioned above, the oven appliance 100 may include at least one levelling leg 302 extending through the cabinet 102 along the vertical direction V from a levelling foot 300 below the cabinet 102 to an adjustment screw 304. As may be seen in FIGS. 7 and 8, the trough 400 may be positioned below the top panel 152 of the cabinet 102 and above the adjustment screw 304. Thus, as may be seen in FIG. 7, access to the adjustment screw 304 may be inhibited by the trough 400, e.g., by the bottom wall 404 of the trough 400. However, the trough 400 may also include an aperture 424 (FIG. 8) defined through the bottom wall 404 and generally aligned with the adjustment screw 304, e.g., generally concentric with the adjustment screw 304 and/or positioned directly above the adjustment screw 304 along the vertical direction V. In order to prevent or limit spills travelling through the aperture 424, a resilient plug 500 may be removably received within the aperture 424, e.g., as illustrated in FIG. 7, and the resilient plug 500 may sealingly engage the aperture 424. For example, as will be described in more detail below, the resilient plug 500 may include a flange 502 that sealingly engages a top side of the bottom wall 404 of the trough 400 around the aperture 424 and a frustoconical body 506 that sealingly engages a bottom side of the bottom wall 404 of the trough 400 around the aperture 424 when the resilient plug 500 is inserted in the aperture 424. For example, the flange 502 may be configured to surround the aperture 424 and sealingly engage the bottom wall 404 of the trough 400 around the periphery of the aperture 424 on the top side of the bottom wall 404, and a proximal end 508 of the frustoconical body 506 may be configured to surround the aperture 424 and sealingly engage the bottom wall 404 of the trough 400 around the periphery of the aperture 424 on the bottom side of the bottom wall 404. The resilient plug 500 may be formed of any suitable resilient material, in particular a heat-resistant resilient material, such as silicone.

Figure 8:
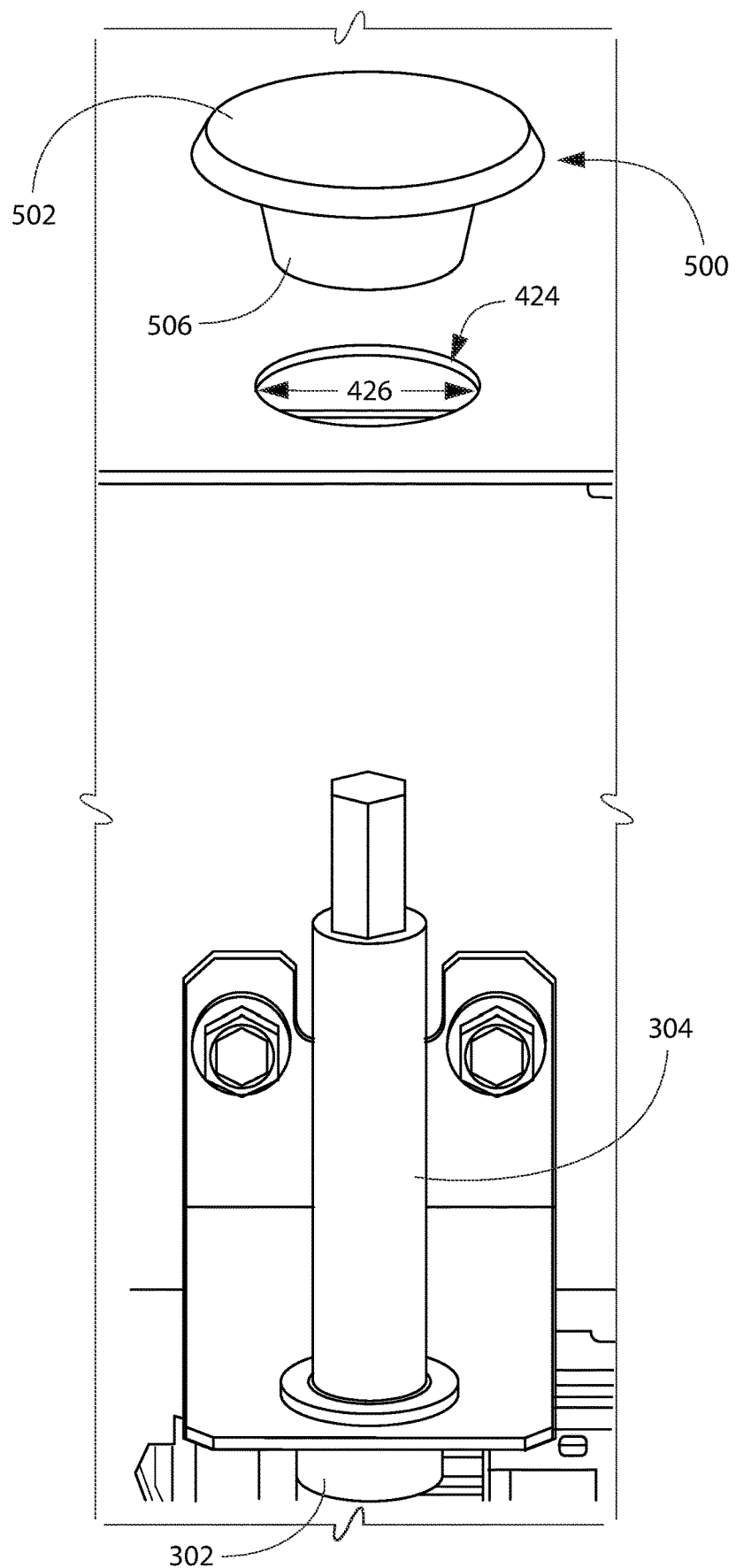
FIG. 8 provides an enlarged view of a trough and a resilient plug of the oven appliance of FIG. 1 with the resilient plug separated from the trough.

As noted in FIG. 8, the aperture 424 may define a second diameter 426. As noted in FIGS. 9 and 10, the flange 502 may define a first diameter 512. As illustrated, the first diameter 512 is greater than the second diameter 426, such as at least about ten percent greater. Thus, the flange 502 may surround and extend beyond the aperture 424 in every direction when the resilient plug 500 is inserted in the aperture 424, to promote sealing engagement of the flange 502 with the bottom wall 404 of the trough 400 around the aperture 424.

Figure 9:
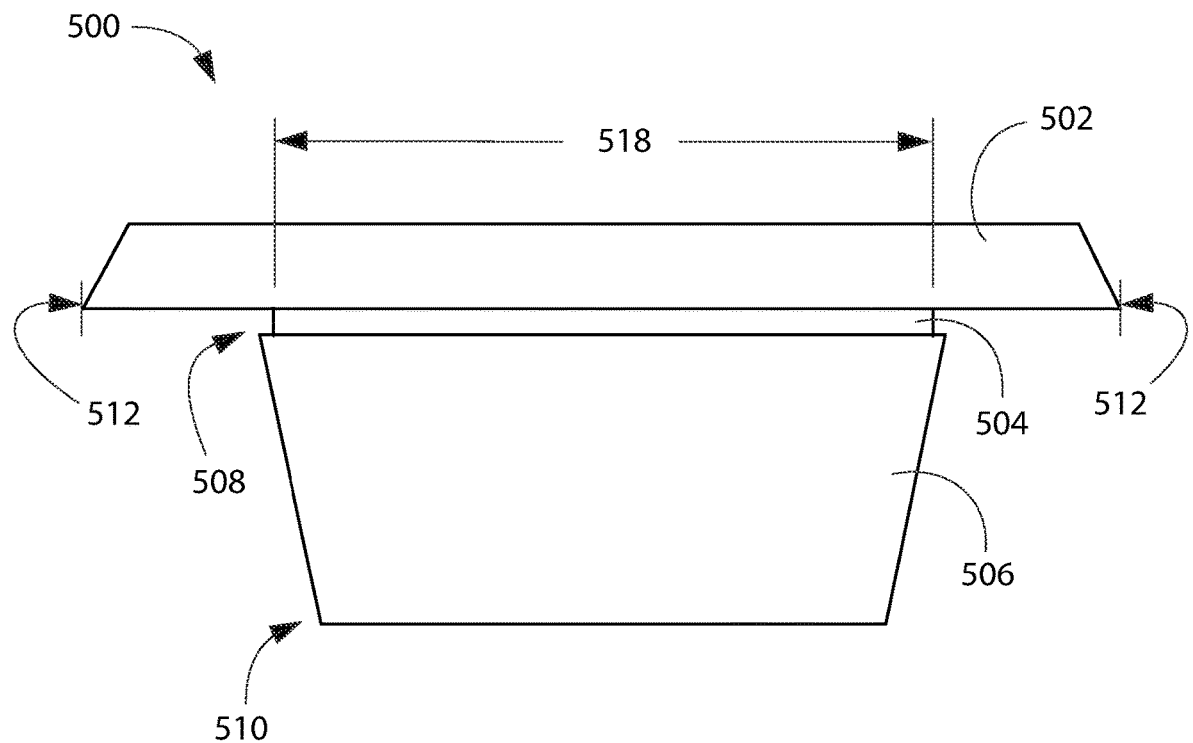
FIG. 9 provides a side view of a resilient plug which may be incorporated with an oven appliance according to one or more exemplary embodiments of the present subject matter.
Figure 10:
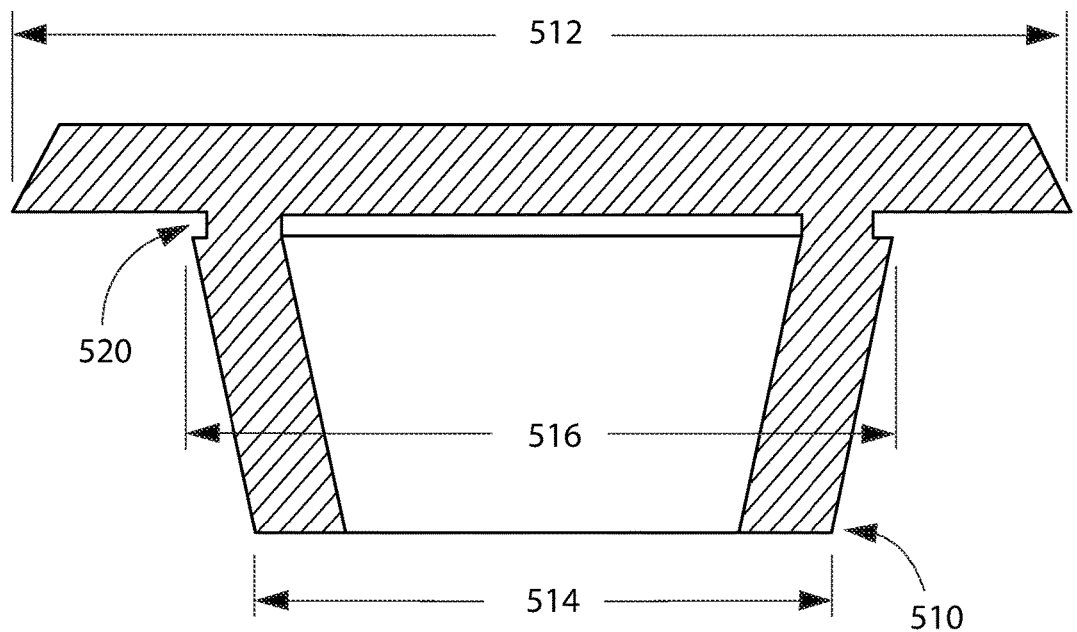
FIG. 10 provides a section view of the resilient plug of FIG. 9.

As illustrated in FIGS. 9 and 10, the resilient plug 500 may also include a cylindrical body 504 which may be joined directly to an underside of the flange 502 at a top end of the cylindrical body 504. The cylindrical body 504 may be joined directly to a proximal end 508 of the frustoconical body 506 at a bottom end of the cylindrical body 504. Thus, the flange 502 may be joined to the frustoconical body 506 indirectly, through the cylindrical body 504. The frustoconical body 506 may extend, e.g., away from the flange 502 and/or cylindrical body 504, to a distal end 510. As may be seen, e.g., in FIGS. 9 and 10, the distal end 510 of the frustoconical body 506 may be a free end, e.g., the distal end 510 of the frustoconical body 506 may be not directly connected to any other portion of the resilient plug 500 than the frustoconical body 506, and the distal end 510 may be open into an interior of the hollow frustoconical body 506.

The frustoconical body 506 may be configured to pass through the aperture 424 when the resilient plug 500 is inserted into the aperture 424. For example, the frustoconical body 506 may be at least partially smaller than the aperture 424 in order to pass through the aperture 424 and the frustoconical body 506 may also be configured to partially deflect during insertion into the aperture 424. For example, the frustoconical body 506 may be hollow, e.g., as illustrated in FIG. 10, to promote flexibility thereof such as deflection during insertion into the aperture 424. More specifically, the frustoconical body 506 may define a third diameter 514 at the distal end 510 of the frustoconical body 506 and a fourth diameter 516 at the proximal end 508 of the frustoconical body 506. The fourth diameter 516 may be greater than the third diameter 514. In such embodiments, the third diameter 514 of the distal end 510 of the frustoconical body 506 may be less than the second diameter 426 of the aperture 424, whereby the distal end 510 may easily pass through the aperture 424. The fourth diameter 516 may be greater than the second diameter 426 of the aperture 424, whereby the resilient plug 500, e.g., the frustoconical body 506 and in particular the proximal end 508 thereof, may deflect, e.g., radially inward, as the frustoconical body 506 passes through the aperture 424, until the resilient plug 500 reaches a fully inserted position, wherein the aperture 424, e.g., the edge of the aperture 424 and/or the edge of the bottom wall 404 of the trough 400 that defines the aperture 424, may be received within a rebate 520 defined by the cylindrical body 504 between the flange 502 and the frustoconical body 506. Thus, in the fully inserted position, the proximal end 508 of the frustoconical body 506 may surround and extend beyond the aperture 424 in every direction when the resilient plug 500 is fully inserted in the aperture 424, to promote sealing engagement of the frustoconical body 506 with the bottom side of the bottom wall 404 of the trough 400 around the aperture 424.

As illustrated in FIG. 9, the cylindrical body 504 may define a fifth diameter 518. The fifth diameter 518 may be less than the first diameter 512 of the flange 502 and less than the fourth diameter 516 of the proximal end 508 of the frustoconical body 506, such that the fifth diameter 518 of the cylindrical body 504 defines the rebate 520 between the flange 502 and the proximal end 508 of the frustoconical body 506. The fifth diameter 518 of the cylindrical body 504 may be less than the second diameter 426 of the aperture 424 such that, as mentioned above, the cylindrical body 504 may be received within and vertically aligned with the aperture 424 when the resilient plug 500 is fully inserted into the aperture 424. It is to be understood that each of the diameters described herein is an outer diameter, such as an outermost diameter, of the respective component, e.g., the third diameter 514 of the distal end 510 of the frustoconical body 506 is the outer diameter, not the inner diameter, of the distal end 510, etc.

Figure 11:
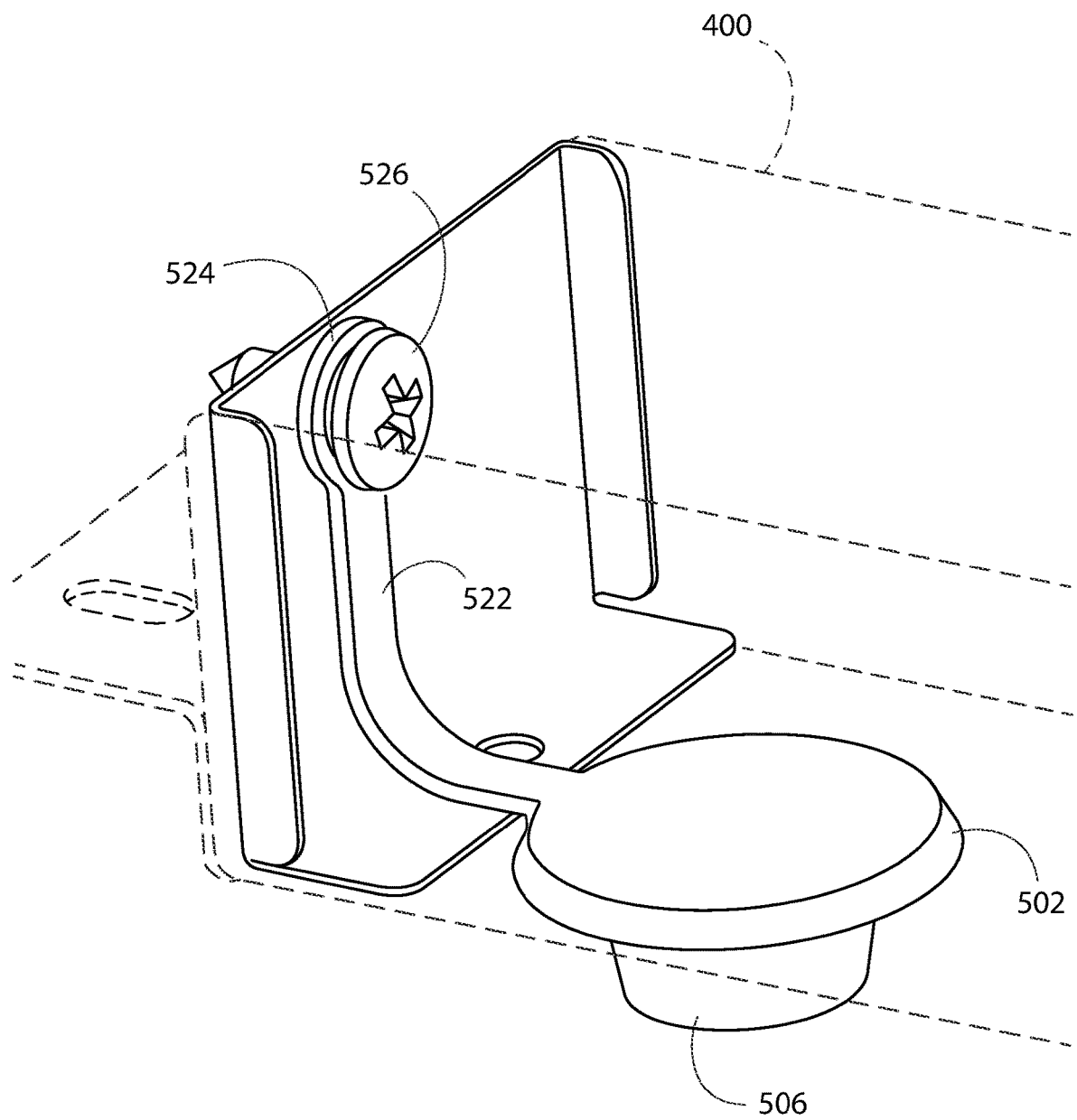
FIG. 11 provides a perspective view of a resilient plug which may be incorporated with an oven appliance according to one or more additional exemplary embodiments of the present subject matter.
Figure 12:
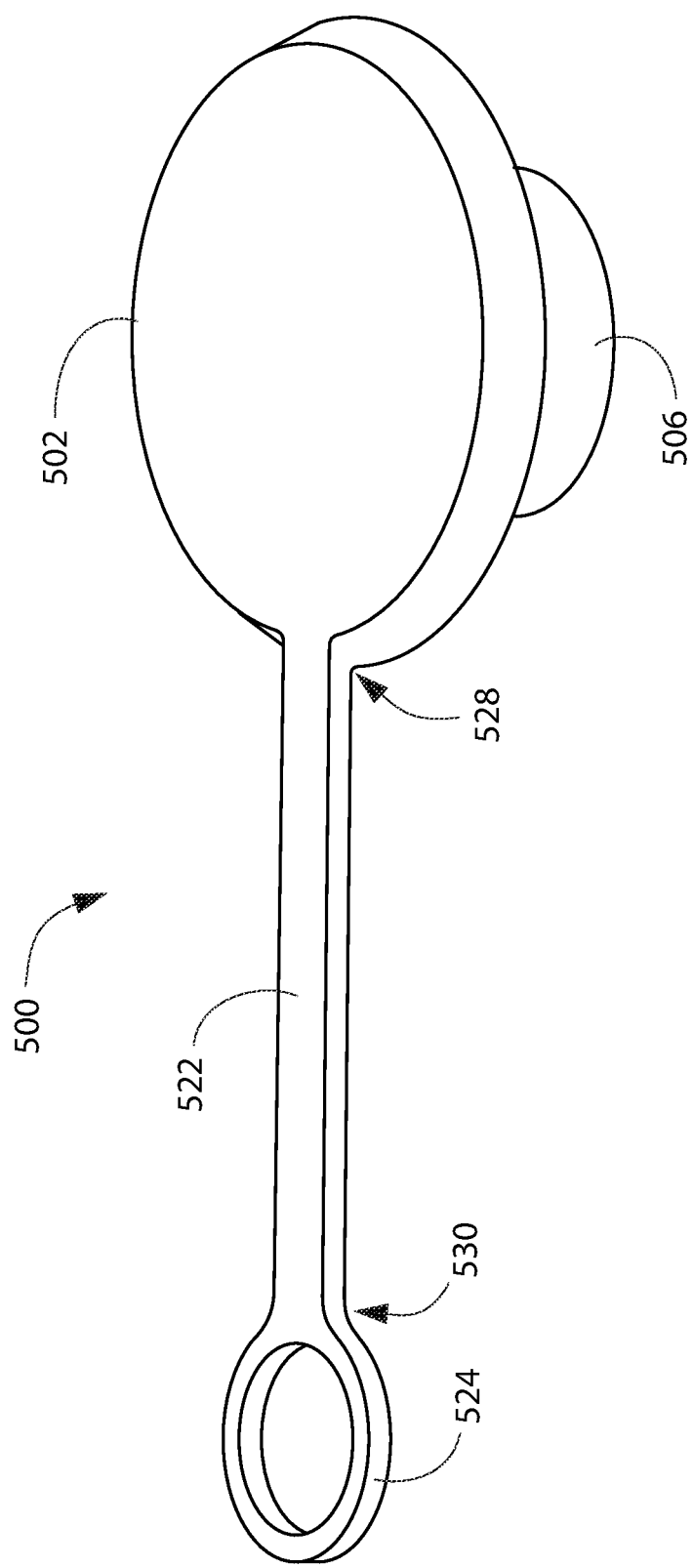
FIG. 12 provides an additional perspective view of the resilient plug of FIG. 11.

In some embodiments, e.g., as illustrated in FIGS. 11 and 12, the resilient plug 500 may also include a strap 522. The strap 522 may be integrally joined to the remainder of the resilient plug 500, such as formed of a single, unitary body with the remainder of the resilient plug 500. For example, the strap 522 may be integrally joined to the flange 502 at a proximal end 528 of the strap 522 and the strap 522 may extend from the proximal end 528 to a distal end 530. A loop 524 may be formed at the distal end 530 of the strap 522. As illustrated in FIG. 11, the loop 524 may be configured to receive a fastener 526 therethrough, e.g., a screw 526 as illustrated in FIG. 11, or other suitable fastener. The resilient plug 500 may secured to the trough 400, such as to one of the walls 416 and 418 thereof, by the mechanical fastener 526 extending through the loop 524 of the resilient plug 500 and into the wall 416 or 418 of the trough 400. The strap 522 and loop 524 may thus serve to prevent or reduce the likelihood of misplacing the resilient plug 500. For example, when the resilient plug 500 is removed from the aperture 424, e.g., to permit access to the adjustment screw 304 for levelling the cabinet 102, the resilient plug 500 may nevertheless be retained within the trough 400 by the strap 522, e.g., by the fastener 526 extending through the loop 524 thereof as described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An oven appliance, comprising:
   a cabinet defining a vertical direction, a lateral direction, and a transverse direction, the vertical, lateral, and transverse directions being mutually perpendicular, the cabinet comprising a front portion spaced apart from a back portion along the transverse direction and a left side spaced apart from a right side along the lateral direction;
   a cooktop defined on a top panel of the cabinet;

a levelling leg extending through the cabinet along the vertical direction from a levelling foot below the cabinet to an adjustment screw below the top panel;

a trough positioned below the top panel of the cabinet and above the adjustment screw, the trough comprising an aperture located directly above the adjustment screw; and a resilient plug configured to be received in the aperture, whereby the resilient plug sealingly engages the aperture.

2. The oven appliance of claim 1, wherein the resilient plug comprises a flange configured to surround the aperture and sealingly engage a bottom wall of the trough around the periphery of the aperture.

3. The oven appliance of claim 2, wherein the flange defines a first diameter, the aperture defines a second diameter, and the first diameter is greater than the second diameter.

4. The oven appliance of claim 1, wherein the resilient plug comprises a frustoconical body configured to pass through the aperture when the resilient plug is inserted into the aperture, and wherein the frustoconical body is hollow.

5. The oven appliance of claim 4, wherein the aperture defines a second diameter, the frustoconical body defines a third diameter at a distal end of the frustoconical body and a fourth diameter at a proximal end of the frustoconical body, wherein the fourth diameter is greater than the third diameter, the third diameter is less than the second diameter, and the fourth diameter is greater than the second diameter.

6. The oven appliance of claim 4, wherein the resilient plug comprises a flange configured to surround the aperture and sealingly engage a bottom wall of the trough around the periphery of the aperture, wherein the frustoconical body extends from a proximal end joined to the flange to a distal end spaced apart from the flange.

7. The oven appliance of claim 6, wherein the distal end of the frustoconical body is a free end.

8. The oven appliance of claim 6, wherein the resilient plug further comprises a cylindrical body between the proximal end of the frustoconical body and the flange, wherein the frustoconical body is joined to the flange by the cylindrical body at the proximal end of the frustoconical body.

9. The oven appliance of claim 8, wherein the flange defines a first diameter, the aperture defines a second diameter, the frustoconical body defines a third diameter at the distal end of the frustoconical body and a fourth diameter at a proximal end of the frustoconical body, and the cylindrical body comprises a fifth diameter, wherein the first diameter is greater than the second diameter, the fourth diameter is greater than the third diameter, the third diameter is less than the second diameter, the fourth diameter is greater than the second diameter, and the fifth diameter is less than the second diameter and greater than the third diameter.

10. The oven appliance of claim 1, wherein the resilient plug comprises a strap integrated with the resilient plug and a loop at a distal end of the strap, the loop configured to receive a fastener whereby the resilient plug is configured to be secured within the trough by the fastener.

11. An oven appliance, comprising:
a cabinet, the cabinet comprising a front portion spaced apart from a back portion and a left side spaced apart from a right side;
a cooktop defined on a top panel of the cabinet;
a levelling leg extending through the cabinet from a levelling foot below the cabinet to an adjustment screw below the top panel;
a trough positioned below the top panel of the cabinet and above the adjustment screw, the trough comprising an aperture located directly above the adjustment screw; and
a resilient plug configured to be received in the aperture, whereby the resilient plug sealingly engages aperture.

12. The oven appliance of claim 11, wherein the resilient plug comprises a flange configured to surround the aperture and sealingly engage a bottom wall of the trough around the periphery of the aperture.

13. The oven appliance of claim 12, wherein the flange defines a first diameter, the aperture defines a second diameter, and the first diameter is greater than the second diameter.

14. The oven appliance of claim 11, wherein the resilient plug comprises a frustoconical body configured to pass through the aperture when the resilient plug is inserted into the aperture, and wherein the frustoconical body is hollow.

15. The oven appliance of claim 14, wherein the aperture defines a second diameter, the frustoconical body defines a third diameter at a distal end of the frustoconical body and a fourth diameter at a proximal end of the frustoconical body, wherein the fourth diameter is greater than the third diameter, the third diameter is less than the second diameter, and the fourth diameter is greater than the second diameter.

16. The oven appliance of claim 14, wherein the resilient plug comprises a flange configured to surround the aperture and sealingly engage a bottom wall of the trough around the periphery of the aperture, wherein the frustoconical body extends from a proximal end joined to the flange to a distal end spaced apart from the flange.

17. The oven appliance of claim 16, wherein the distal end of the frustoconical body is a free end.

18. The oven appliance of claim 16, wherein the resilient plug further comprises a cylindrical body between the proximal end of the frustoconical body and the flange, wherein the frustoconical body is joined to the flange by the cylindrical body at the proximal end of the frustoconical body.

19. The oven appliance of claim 18, wherein the flange defines a first diameter, the aperture defines a second diameter, the frustoconical body defines a third diameter at the distal end of the frustoconical body and a fourth diameter at a proximal end of the frustoconical body, and the cylindrical body comprises a fifth diameter, wherein the first diameter is greater than the second diameter, the fourth diameter is greater than the third diameter, the third diameter is less than the second diameter, the fourth diameter is greater than the second diameter, and the fifth diameter is less than the second diameter and greater than the third diameter.

20. The oven appliance of claim 11, wherein the resilient plug comprises a strap integrated with the resilient plug and a loop at a distal end of the strap, the loop configured to receive a fastener whereby the resilient plug is configured to be secured within the trough by the fastener.

* * * * *